June 15, 1965  A. ANSCHERLÍK  3,189,533
AUTOMATIC COULOMETRIC ANALYZER
Filed May 11, 1961  2 Sheets-Sheet 2
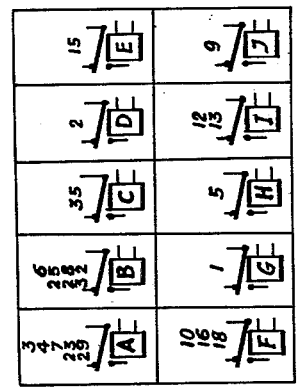
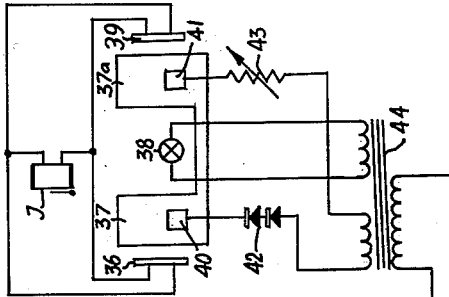
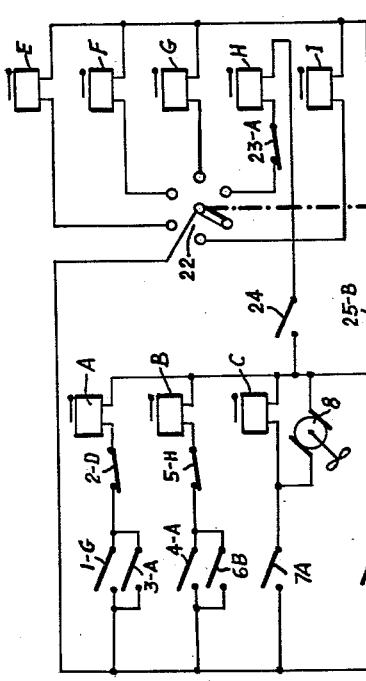
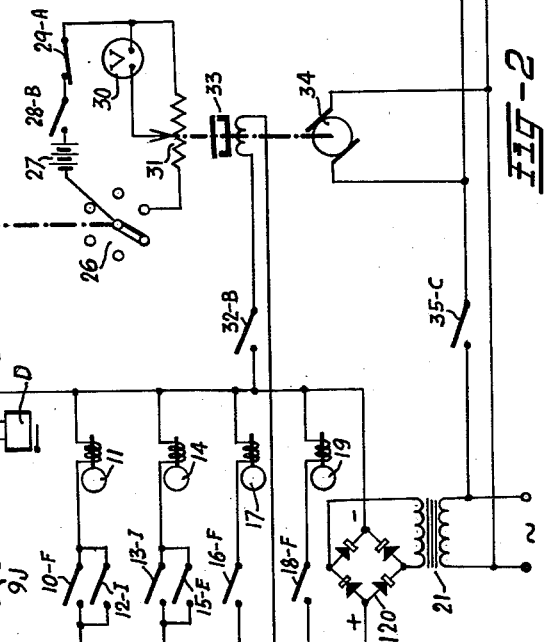
INVENTOR.
Arnošt Anscherlík
BY
Richard Lund
Agt

United States Patent Office 3,189,533
Patented June 15, 1965

3,189,533
AUTOMATIC COULOMETRIC ANALYZER
Arnošt Anscherlík, 5 Revoluční, Prague 1, Czechoslovakia
Filed May 11, 1961, Ser. No. 109,303
Claims priority, application Czechoslovakia,
May 23, 1960, 3,327/60
10 Claims. (Cl. 204—195)

This invention relates to coulometric apparatus for automatically measuring the permanent and temporary hardness of water and like quantitative chemical data capable of being determined by titration.

The chemical treatment of boiler feed water and other chemical operations require frequent analysis of samples. During water treatment, the permanent and temporary hardness has hitherto been ascertained by laboratory tests involving titration. Analysis of this kind yields data on operating conditions a relatively long time after the taking of the sample. It is subject to human error and is, therefore, not fully reliable.

The object of this invention is the provision of automatic apparatus for coulometric titration. A more specific object is the provision of apparatus for automatic determination of permanent and temporary hardness in boiler feed water.

The apparatus according to this invention operates in the following manner:

Samples of the liquid to be tested are periodically taken. Each sample is mixed with a salt solution, and the mixture is subjected to electrolysis by a constant direct current. The anolyte and catholyte obtained by electrolytic dissociation of the salt in two connected containers react with the hardness forming compounds in the sample, and cause colour changes of indicators added simultaneously with the salt solution. The end point of the reaction is established photometrically, and the amount of anolyte or catholyte consumed is determined from the amount of current used.

For the determination of the temporary hardness of water, sodium sulphate is the preferred salt added and methyl-orange serves as the indicator; the permanent water hardness is ascertained with phenolphthalein.

The sulfuric acid formed by dissociation of sodium sulfate reacts with bicarbonates in the sample and produces a colour change of the methyl-orange indicator at pH 4.2.

The exact nature of this invention as well as other objects and advantages will be readily apparent from consideration of the following specification relating to the annexed drawing in which:

FIG. 2 is a schematic wiring diagram of electrical apparatus illustrated in FIG. 1; and FIG. 2A tabulates information contained in the diagram of FIG. 2.

Figure 1:
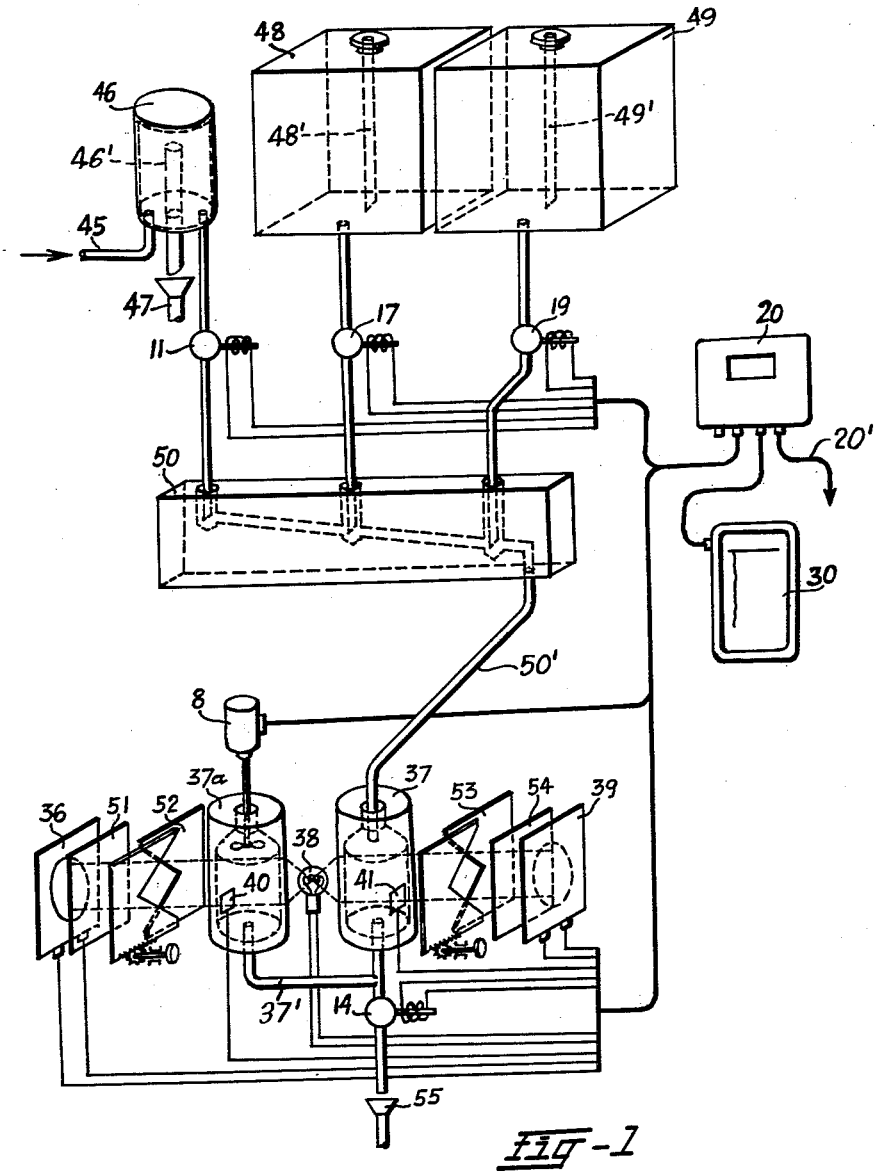
FIG. 1 is a diagrammatic representation of automatic analysis apparatus of the invention.

Referring initially to FIG. 1, there is seen a feed tube 45 through which the liquid to be analyzed is fed in continuous stream to the bottom of a vessel 46 equipped with an overflow pipe 46' for maintaining a constant liquid level in the vessel 46. Excess liquid is discharged through the overflow pipe 46' and a drain 47. An electromagnetically operated normally closed valve 11 communicates with the bottom of the vessel 46.

Two substantially closed containers 48 and 49 are respectively provided for sodium sulfate solution and for indicator solution. Respective vent pipes 48', 49' extending below the liquid level in the respective containers 48, 49 maintain constant hydrostatic pressure in two normally closed magnetically operated valves 17 and 19 which respectively communicate with the bottom portions of the containers 48, 49.

The several liquids discharged from the valves 11, 17, 19 flow by gravity into a tubular mixing vessel 50, and thence through a tube 50' into an electrolytic half cell 37 provided with an electrode 41. A tube 37' forms a bridge between the half cell 37 and another half cell 37a equipped with an electrode 40 and a motor driven stirrer 8. A normally closed electromagnetically actuated drain valve 14 is connected to the tube 37' and opens downward into a drain 55.

An incandescent lamp 38 is arranged between the half cells 37, 37a to project respective beams of light through the half cells. The intensity of the beam having passed the half cell 37a is controlled by an adjustable diaphragm 52, and the beam is filtered through a colored filter 51 before falling on a photoelectric selenium cell 36. The other beam similarly passes in sequence through the half cell 37, an adjustable diaphragm 53, and a colored filter 54, and ultimately falls on a photoelectric selenium cell 39.

A box 20 houses the electrical control of the apparatus which are connected by conductors to the valves 11, 14, 17, 19, the stirrer 8, the electrodes 40 and 41, and the selenium cells 36, 39. A recording voltmeter 30 also is connected to the apparatus in the box 20 which has a power cord 20' attached thereto for connection to an alternating current supply.

FIG. 2 is a schematic wiring diagram of the controls contained within the box 20. The alternating current terminals of the control apparatus are connected in parallel to the primary windings of two transformers 21, 44, and to two synchronous motors of which only one motor 34 is shown in FIG. 2. The non-illustrated synchronous motor drives two rotary switches 22, 26, and the drum carrying the chart of the voltmeter 30.

The secondary winding of the transformer 21 supplies alternating current to a full-wave rectifier 120 which energizes the valves 11, 14, 17, and 19, the stirrer 8, an electromagnetic clutch 33 on the output shaft of the motor 34, and nine relays A to I. A tenth relay J will be referred to hereinbelow. The contacts of these relays are normally open unless specifically stated otherwise. In a first circuit, the coil of the valve 19 is arranged in series with the contacts 18 of the solution feeding relay F. The contacts 16 of the same relay are arranged in series with the coil of the valve 17. The contacts 13 of the rinsing relay I and 15 of the sample draining relay E are in parallel series circuit with the valve 11 which may thus be independently opened by either relay. Contacts 9 of the photocell relay J are in series with the coil of the auxiliary disconnecting relay D.

The stirrer 8 and the coil of the power supply relay C are jointly controlled by the contacts 7 of the first holding relay A. The parallel contacts 4 of relay A and 6 of the second holding relay B are arranged in series with the normally closed contacts 5 of the measurement terminating relay H and the coil of relay B. Similarly, the parallel contacts 1 of the measurement starting relay G and 3 of relay A are in series connection with the normally closed contacts 2 of relay D and the coil of relay A.

One pole of the rectifier 120 is connected to the movable contact of the rotary switch 22. Five of the six fixed contacts of the switch 22 are respectively connected in this order to first terminals of the relay coils I, E, F, G, and through the normally closed contacts 23 of relay A to a first terminal of the relay coil H. The second terminals of the coils I, E, F, and G are jointly connected to the other rectifier pole through the normally closed contact 25 of relay B. The second terminal of relay H is connected to the other rectifier pole through the normally open contacts of a switch 24 which is briefly closed at twenty second intervals by the non-illustrated depresser mechanism of the recording voltmeter 30.

The electromagnetic clutch 33 on the output shaft of the motor 34 is in series circuit with contacts 32 of the relay B. The clutch actuates movement of the sliding contact of a potentiometer 31 which is connected to one terminal of the recording voltmeter 30. The fixed resistor of the potentiometer is interposed between the other voltmeter terminal and that fixed contact of the rotary switch 26 which is reached by the movable switch contact when the movable contact of the switch 22 closes the circuit of the relay coil H. The movable contact of the switch 26 is in series circuit with a battery 27, the normally open contacts 28 of the relay B, the normally closed contacts 29 of the relay A, and the aforementioned second terminal of the voltmeter 30.

Power supply to the transformer 44 and the motor 34 is controlled by contacts 35 of the relay C. The transformer 44 has two secondary windings of which one energizes the incandescent bulb 38. The other winding provides pulsating direct current to the electrodes 40 and 41 in the half cells 37, 37a through a half wave rectifier 42 and the rheostat 43. The selenium cells 36 and 39 are connected in parallel but with opposite polarity to the coil of the relay J so as to energize the photocell relay J when the outputs of the photoelectric cells differ.

For more convenient reference, the contacts respectively associated with the relays A to J are tabulated in FIG. 2A.

The apparatus illustrated in FIG. 1 is electrically operated by the controls shown in FIG. 2 in the following manner:

The valves 11, 17, 19 are opened for a fixed period. Because of the constant hydrostatic head in the vessels 46, 48, 49, precisely measured amounts of the sample to be analyzed, of the sodium sulfate solution, and of the indicator solution are delivered to the mixing vessel 50, and are discharged therefrom in mixed condition to the half cells 37, 37a in which a common liquid level is established through the relatively narrow and long bridge 37'.

A constant direct current is next supplied to the electrodes 40, 41 whereby free sodium hydroxide is formed in the catholyte contained in half cell 37, and free sulfuric acid in the anolyte of half cell 37a. With a current of adequate magnitude and proper dimensions of the bridge 37', mixing of anolyte and catholyte during the test period can be held to an insignificant value. The stirrer 8 is energized during electrolysis to expedite formation of sulfuric acid in the half cell 37a.

Current is fed to the incandescent lamp 38. Its light, suitably adjusted for intensity and color by the diaphragms 52, 53 and the filters 51, 54, falls on the two photoelectric selenium cells 36, 39. The output potentials of the two cells balance each other as long as the liquids in both half cells have the same color. A difference in color brought about by the pH change affecting the methyl orange indicator produces a current signal from the photoelectric cells which terminates the test.

The time elapsed between start of electrolysis and the development of the desired color difference is measured by converting it into a voltage value, feeding the voltage to the voltmeter 30, and recording the measured voltage on a moving chart in the usual manner. With fixed amounts of sample and reagents and a constant current, the voltage recorded is a direct measure of the concentration of hardness forming constituents in the original sample.

The connected switches 22 and 26 control the program cycle of the apparatus including the filling of the measuring vessel, the starting of electrolysis, the recording of the time elapsed during current passage, and the emptying and rinsing of the electrolytic half cells. The switches are elements of the recording voltmeter 30 and their movements are synchronized with that of the recording drum.

On starting the apparatus, the second holding relay B is in the inoperative position and the contact 25–B is closed. The rotary switch 22 sequentially energizes the relay I which actuates the electromagnetic valves 11 and 14 for rinsing the measuring vessel, the relay E which again opens the drain valve 14, and relay F which actuates the feed valves 11, 17 and 19. The half cells 37, 37a are thereby filled with reaction mixture. In its next position the switch 22 energizes the starting relay G which in turn energizes the first holding relay A by means of contact 1–G. The relay A is kept energized by holding contact 3–A as long as the contact 2–D of the auxiliary disconnecting relay D is closed.

The first retaining relay A also energizes the second holding relay B which is kept energized by contact 6–B as long as the contact 5–H of the relay H is closed. Relay A simultaneously actuates through contact 7–A the power suply relay C and the stirrer 8. When relay C attracts its armature, contact 35–C starts the synchronous electric motor 34 and connects the transformer 44 to the power line, thereby feeding alternating current to the incandescent lamp 38, and to the half-wave rectifier 42 after stabilizing by the adjustable resistor 43, the direct current of constant intensity supplied by rectifier 42 is fed to the electrodes 40 and 41.

The second holding relay B also closes its contact 32–B, and thereby energizes the electromagnetic clutch 33 which couples the synchronous motor 34 to the sliding contact of the potentiometer 31. At the same time contact 25–B is opened and disconnects the rectifier 120 from the relays E which actuates sample drainage, F which controls flow of sample and reagent solutions, G which starts the apparatus and I which causes rinsing the measuring vessel.

As mentioned above, the direct current of constant intensity passing through the electrodes 40, 41 decomposes the salt added to the sample in the half-cells which respectively contain the anolyte and catholyte. The sulfuric acid formed in the anolyte reacts with substances contained in the sample and produces a colour change of the indicator. This colour change is converted by the photocells 36 and 39 into electric voltage which actuates the relay J. Contact 9–J of this relay operates the auxiliary disconnecting relay D whose contact 2–D is opened and deenergizes the first holding relay A. This causes the current to the motor 34, the lamp 38, the electrodes 40, 41 and the stirrer 8 to be switched off.

In the meantime, the sliding contact of the potentiometer 31 was shifted by the motor 34. When the switch 22 is connected to the measurement terminating relay H, the voltage between the sliding contact of the potentiometer 31 and the contact 29–A is applied to the voltmeter 30. The passage of current from the battery 27 through the potentiometer 31 is made possible by the closing of the contact 29–A as the first holding relay A is deenergized and of the connecting contact 28–B of the second holding relay B. The switch 22 simultaneously reaches the position in which the relay H is connected to its power supply. Since the first holding relay A is deenergized the contact 23–A is closed, the switch 24, which is linked to the depressor mechanism of the intermittently recording voltmeter 30 and is closed thereby in intervals of twenty seconds, can actuate the measurement terminating relay H. The contact 5–H is opened and interrupts the circuit of the second holding relay B. This in turn disconnects the electromagnetic coupling 33, and a non-illustrated spring returns the sliding contact of the potentiometer 31 to the starting position.

As soon as the first holding relay A is deenergized by the photocell relay J a recording is made of the time during which direct current of constant intensity was flowing between the electrodes 40 and 41 through the solution in the half cells 37, 37a. This time is proportional to the concentration of hardness forming constituents in the sample. A new operating cycle of the apparatus cannot be started until the result of the preceding test has been recorded.

After disengaging the second holding relay B, the switch 22 can energize the relay I which initiates the rinsing of the apparatus, and the relay E which opens the drain valve 14. The apparatus is ready for a new operating cycle.

What I claim is:
1. In an analyzer, in combination:
  (a) two containers;
  (b) an electrode in each container;
  (c) a conduit connecting said containers, said conduit having an inside diameter substantially narrower than that of the containers such that the conduit will allow the passage of liquids but would prevent significant intermixing of liquids in said containers;
  (d) supply means for supplying an electrically conductive liquid mixture to said containers and to said conduit, said conduit when supplied with said mixture constituting an electrolytic bridge between said containers;
  (e) a source of direct current adapted to be connected to said electrodes;
  (f) photoelectric means for generating an electrical signal responsive to a color difference of respective portions of said liquid mixture in said containers;
  (g) electric control means for actuating said supply means and for connecting said source of current to said electrodes in timed sequence; and
  (h) time sensing means operatively connected to said control means and to said photoelectric means for sensing the time elapsed between the connecting of said source to said electrodes and the generating of said signal.

2. In an analyzer as set forth in claim 1, said photoelectric means including a single light source; two photoelectric elements each responsive to the light of said source for producing electric potential, said containers being respectively interposed between said elements and said light source for passage of said light through said respective portions of said liquid mixture from said source to said element; and circuit means connecting said elements for generating said signal in response to the electric potentials produced by said photoelectric elements.

3. In an analyzer as set forth in claim 2, said circuit means connecting said photoelectric elements in parallel circuit with opposite polarity.

4. In an analyzer as set forth in claim 1, recording means for recording the time sensed by said time sensing means.

5. In an analyzer as set forth in claim 1, said supply means including a source of a sample to be analyzed, a source of a reagent capable of dissociating in said mixture responsive to said direct current and of forming a compound capable of reacting in a predetermined proportion with said sample, and a source of an indicator responsive to an excess of said compound by a change in color; and electrically operated valve means connected to said control means for connecting said sources of said sample, of said reagent, and of said indicator to said containers and to said conduit for a predetermined time.

6. In an analyzer as set forth in claim 1, said control means including blocking means operatively connected to said photoelectric means and to said supply means for blocking actuation of said supply means after said source of current has been connected to said electrodes and prior to the generating of said signal.

7. In an analyzer as set forth in claim 1, stirrer means in one of said containers connected to said control means for actuation simultaneously with the connecting of said source of direct current to said electrodes.

8. In an analyzer as set forth in claim 1, said time sensing means including a source of electric potential, potentiometer means in circuit with said source of potential and comprising a movable contact for dividing said potential, actuating means connected to said control means and said photoelectric means and responsive to the connecting of said electrodes to actuate movement of said movable contact, a measuring instrument connected to said potentiometer for measuring said divided potential, said actuating means being responsive to said generated signal for arresting movement of said movable contact.

9. In an analyzer as set forth in claim 8, said actuating means including an electric motor and electrically operated clutch means interposed between said motor and said movable contact.

10. In an analyzer as set forth in claim 1, said control means including program source means for sequentially actuating said supply means, for connecting said source of direct current to said electrodes, and for actuating said time sensing means in a predetermined cycle.

References Cited by the Examiner
UNITED STATES PATENTS

| | | | |
|---|---|---|---|
| 2,832,734 | 4/58 | Eckfeldt | 204—195 |
| 2,928,782 | 3/60 | Leisey | 204—195 |
| 2,989,377 | 6/61 | Leisey | 324—30 |
| 3,030,280 | 4/62 | Miller | 204—195 |

JOHN H. MACK, *Primary Examiner.*

JOHN R. SPECK, MURRAY TILLMAN, WINSTON A. DOUGLAS, *Examiners.*